(12) United States Patent
De Acutis et al.

(10) Patent No.: US 11,213,043 B2
(45) Date of Patent: Jan. 4, 2022

(54) AMORPHOUS POROUS PARTICLES FOR REDUCING SUGAR IN FOOD

(71) Applicant: NESTEC S.A., Vevey (CH)

(72) Inventors: Rodolfo De Acutis, York (GB); Andrew Steven Whitehouse, Harrogate (GB); Laurent Forny, Lausanne (CH); Vincent Daniel Maurice Meunier, Epalinges (CH); Marina Dupas-Langlet, Savigny (CH); Julien Philippe Nicolas Mahieux, Ecoteaux (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/779,226

(22) PCT Filed: Nov. 30, 2016

(86) PCT No.: PCT/EP2016/079264
§ 371 (c)(1),
(2) Date: May 25, 2018

(87) PCT Pub. No.: WO2017/093309
PCT Pub. Date: Jun. 8, 2017

(65) Prior Publication Data
US 2018/0343885 A1 Dec. 6, 2018

(30) Foreign Application Priority Data
Nov. 30, 2015 (EP) .................................. 15197120

(51) Int. Cl.
| | | |
|---|---|---|
| *A23G 1/40* | (2006.01) | |
| *A23L 29/30* | (2016.01) | |
| *A23G 3/42* | (2006.01) | |
| *A23G 9/34* | (2006.01) | |
| *A23L 27/30* | (2016.01) | |
| *A23P 10/40* | (2016.01) | |
| *A23G 1/36* | (2006.01) | |
| *A23G 1/46* | (2006.01) | |
| *A23L 3/46* | (2006.01) | |
| *C13B 50/00* | (2011.01) | |
| *A23P 10/20* | (2016.01) | |

(52) U.S. Cl.
CPC .................. *A23G 1/40* (2013.01); *A23G 1/36* (2013.01); *A23G 1/46* (2013.01); *A23G 3/42* (2013.01); *A23G 9/34* (2013.01); *A23L 3/46* (2013.01); *A23L 27/33* (2016.08); *A23L 29/30* (2016.08); *A23L 29/35* (2016.08); *A23P 10/20* (2016.08); *A23P 10/40* (2016.08); *C13B 50/002* (2013.01); *A23V 2002/00* (2013.01)

(58) Field of Classification Search
CPC ... A23G 1/40; A23G 1/46; A23P 10/20; A23P 10/40; A23L 27/33; A23L 29/30; A23L 29/35; A23L 3/46; C12B 50/002; C13B 50/004; A23V 2002/00
USPC ....................................................... 426/631
See application file for complete search history.

(56) References Cited

U.S. PATENT DOCUMENTS

| | | | |
|---|---|---|---|
| 3,218,174 A | | 11/1965 | Schubiger et al. |
| 3,930,048 A | | 12/1975 | Wookey et al. |
| 6,953,592 B2 † | | 10/2005 | Darbyshire |
| 7,736,683 B2 † | | 6/2010 | Zeller |
| 8,486,477 B2 † | | 7/2013 | Zeller |
| 2005/0118327 A1 | | 6/2005 | Best et al. |
| 2006/0040023 A1 | | 2/2006 | Zeller et al. |
| 2006/0286272 A1* | | 12/2006 | Hanselmann .......... A23G 1/305 426/631 |
| 2007/0212476 A1* | | 9/2007 | Destephen ........... A23G 3/0017 426/660 |
| 2013/0251884 A1* | | 9/2013 | Langrish ................... A23L 2/08 426/616 |

FOREIGN PATENT DOCUMENTS

| | | |
|---|---|---|
| CL | 2018001314 A1 | 6/2018 |
| CN | 1058515 A | 2/1992 |
| GB | 1219996 | 1/1971 |
| JP | 2006055167 | 3/2006 |
| JP | 2016531560 | 10/2016 |
| MX | PA05008720 A | 4/2006 |
| RU | 2254762 C2 | 6/2005 |
| RU | 2453143 C2 | 6/2012 |
| RU | 2543154 C2 | 2/2015 |
| WO | 0069414 A2 | 11/2000 |
| WO | 2006130698 | 12/2006 |
| WO | 2012050439 | 4/2012 |
| WO | 2015049292 | 4/2015 |

OTHER PUBLICATIONS

Adhikari et al. "Effect of addition of proteins on the production of amorphous sucrose powder through spray drying" Journal of Food Engineering, 2009, vol. 94, pp. 144-153.
Japanese Office Action dated Jul. 7, 2020 for Application No. P2018-526703 (8 pages).
Chinese Office Action for Appl No. 201680065779.2 dated May 8, 2021.

\* cited by examiner
† cited by third party

*Primary Examiner* — Hamid R Badr
(74) *Attorney, Agent, or Firm* — K&L Gates LLP

(57) ABSTRACT

The present invention relates to amorphous porous particles comprising sugar, a bulking agent and surfactant, having a closed porosity of between 20 to 60%. Further aspects of the invention relate to a food product comprising the amorphous porous particles; a process of making the amorphous porous particles and a fat based confectionery product containing them; and the use of the amorphous porous particles as bulk sugar replacers in food products such as fat based confectionery products for example, chocolate.

14 Claims, 7 Drawing Sheets

AMORPHOUS POROUS PARTICLES FOR REDUCING SUGAR IN FOOD

CROSS REFERENCE TO RELATED APPLICATIONS

The present application is a National Stage of International Application No. PCT/EP2016/079264, filed on Nov. 30, 2016, which claims priority to European Patent Application No. 15197120.7, filed on Nov. 30, 2015, the entire contents of which are being incorporated herein by reference.

FIELD OF THE INVENTION

The present invention relates to amorphous porous particles comprising sugar, a bulking agent and surfactant, having a closed porosity of between 20 to 60%. Further aspects of the invention relate to a food product comprising the amorphous porous particles; a process of making the amorphous porous particles and a fat based confectionery product containing them; and the use of the amorphous porous particles as bulk sugar replacers in food products such as fat based confectionery products for example, chocolate.

BACKGROUND OF THE INVENTION

Any discussion of the prior art throughout the specification should in no way be considered as an admission that such prior art is widely known or forms part of common general knowledge in the field.

The increasing interest in reduced sugar intake in the diet by health conscious consumers has led to a strong demand for food products with lower sugars. Sugar, however, is a key food ingredient that in addition to imparting natural sweetness to food products also functions to provide bulk and therefore plays a significant role in the structure, volume and mouthfeel of the finished food product.

Sugar is a naturally occurring sweetener that as aforementioned provides the sweetness in food products that consumers crave but is also highly calorific and so there is an important need for healthier, non-caloric or low-caloric sweetener alternatives. There have been many approaches that are well known in the art, involving the replacement or reduction of sugars in food products such as for instance using artificial sweeteners to replace natural sugar. More particularly, for example, for fat based confectionery products such as chocolate, many attempts have been made to provide a substitute for sugar using reduced sugar alcohols or 'polyols. Other approaches have included using bulking agents such as, non or low-caloric fibres to replace sugar in chocolate compositions. These approaches however, have associated disadvantages, for instance polyols are well known to have undesirable laxative effects and furthermore such artificial sweeteners are not well perceived by consumers who have a preference for clean label products. There are also certain disadvantages linked to the use of bulking agents to replace sugars in food products this is mainly the associated undesirable impact on sweetness usually a reduction in sweetness.

Thus, it is generally well known to those skilled in the art of food manufacturing that replacing or reducing sugar in a food composition usually negatively impacts the flavour, and other taste components. For instance, sugar replacers may be slower in onset of the sweetness perception and longer in duration compared to natural sugar and so therefore change the taste balance of a food composition.

In addition sugar replacers may not deliver as sweet a taste as natural sugar and may also exhibit, metallic, cooling, astringent, liquorice-like, and bitter after tastes.

In a further example, applying the prior art solutions as aforementioned for fat based confectionery products may also result in similar disadvantages. For instance, using bulking agents such as fibres in chocolate compositions leads to bitter aftertastes and adds undesirable bulk to the mixture, resulting in an increase in the viscosity of the mixture. This in turn makes it difficult to carry out the standard post-processing of the mixture such as enrobing and moulding which are essential steps towards furnishing a finished chocolate product.

There thus remains the problem of providing low calorie or reduced sugar alternatives to natural sugar which may be used in food products or confectionery products without having a detrimental impact on the sweetness perception and/or any of the above associated problems of the prior art solutions.

Accordingly, there remains a need to find low calorie sugar replacers that can be used in a food product or confectionery compositions such as chocolate for example, which avoids the problems of loss or reduction in sweetness, bitter aftertastes and off-flavours.

Accordingly there remains a need to provide low calorie sugar replacers that are "clean label" and more desirable to the consumer.

It is thus desirable to provide a healthier, reduced calorie or reduced sugar alternative to natural sugar that may be used in food products or confectionery products wherein there is little or no negative impact on sweetness perception.

There thus exists a need to solve one or more of the above mentioned problems.

It is an object of the present invention to ameliorate at least one disadvantage of the prior art as aforementioned of previous reduced or low calorie sugar alternatives such as artificial sweeteners and/or bulk sugar replacers such as fibres.

SUMMARY OF THE INVENTION

Accordingly this need is solved by the features of the independent claims. The dependent claims further develop the central idea of the invention.

Thus, in a first aspect, the present invention relates to amorphous porous particles comprising sugar, a bulking agent and a surfactant wherein said amorphous porous particles have a closed porosity of between 20 to 60%. Said amorphous particles may be spherical, for example may have a sphericity of between 0.8 and 1, but preferably the amorphous particles have been refined, for example by roll refining.

In a further aspect, the amorphous porous particles of the present invention have a D90 particle size less than 60 microns, for example preferably between 30 to 60 microns, more preferably between 35 to 50 microns.

In another embodiment the amorphous porous particles of the present invention have a D90 particle size from 30 to 140 microns.

It has been surprisingly found by the inventors that the amorphous porous particles of the present invention can be used to replace sugar (such as sucrose) in a food product for example without having a detrimental effect on the sweetness of the food product.

Also surprisingly it was found that the amorphous porous particles of the present invention overcome the problems normally associated with handling amorphous sugar based powder materials and can, contrary to known amorphous sugar based materials, be used in chocolate compositions, for example. So for example, because of the hygroscopic nature and so its water content amorphous sugar is not typically used in chocolate compositions. It undesirably absorbs water from the environment and other chocolate ingredients generating potential difficulties during processing and storage. Furthermore the amorphous state can be unstable, and amorphous sugars, such as sucrose or dextrose, tend to rapidly crystallise in the presence of moisture and/or release moisture from crystallisation.

Advantageously, it was surprisingly found that at equivalent volumes the aerated amorphous porous particles of the present invention gave at least equivalent or more sweetness to a fuller denser crystalline sugar.

In another aspect, there is provided a food product comprising the amorphous porous particles of the present invention. The food product may for example contain 5 to 60% of the amorphous porous particles.

In a further aspect a food product according to the present invention is a confectionery product, a culinary product, a dairy product, a nutritional formula, a breakfast cereal or an ice-cream.

In a still further aspect of the present invention the food product is a fat based confectionery product for example chocolate.

Advantageously the present invention makes possible the preparation of food products such as fat based confectionery products in which the high calorific natural sugar can be wholly and/or partially replaced by the low calorific amorphous porous particles of the present invention.

Advantageously the amorphous porous particles of the present invention are more easily dispersed within a fat based continuous phase and require a minimal amount of carrier fluid, for example in the preparation of fat based confectionery products for example chocolate.

In another aspect of the present invention there is provided a process of making the amorphous porous particles comprising the steps of:
 a) subjecting a mixture comprising sugar, bulking agent and surfactant to high pressure, preferably 50 to 300 bar, more preferably 100 to 200 bar
 b) adding gas to the pressurised mixture
 c) spraying and drying the mixture to form amorphous porous particles and
 d) reducing the particle size of the amorphous porous particles.

In another aspect there is provided a use of the amorphous porous sucrose particles of the present invention as a sugar replacer in a food product.

It was surprisingly found that from between up to 30%, preferably 65%, more preferably up to 70% of the usually required sweetener such as sugar can be eliminated from the foodstuff while still achieving the same desired level of sweetness perception using the amorphous porous particles of the present invention to replace.

In another aspect of the present invention there is provided a fat based confectionery composition comprising
 a) cocoa powder or cocoa liquor or cocoa butter or cocoa butter equivalents or any combinations thereof and
 b) 5 to 60 wt % of amorphous porous particles according to the present invention
wherein said amorphous porous particles comprise sugar, a bulking agent and a surfactant, and wherein said amorphous porous particles have a closed porosity of between 20 to 60%. In another aspect there is provided a use of the amorphous porous particles of the present invention as a bulk sugar replacer in a food product.

In a further aspect of the present invention, the food product is confectionery product, a culinary product, a dairy product, a nutritional formula, a breakfast cereal or an ice-cream.

In another aspect of the present invention there is provided a sugar replacement or sweetener composition comprising amorphous porous particles comprising sugar, a bulking agent and a surfactant, wherein said amorphous porous particles have a closed porosity of between 20 to 60%.

Surprisingly the amorphous porous particles of the present invention overcome the usual problems associated with handling amorphous powders such as hygroscopicity.

Advantageously, the amorphous porous particles of the present invention are more stable and less likely to recrystallize to the lesser desirable crystalline form.

Furthermore advantageously, the present invention makes possible the preparation of food products, in particular fat based confectionery food products incorporating the amorphous porous particles of the present invention, having better stability such as lesser likelihood of undesirable recrystallization of the sugar and so resulting in a longer shelf life of such products.

Advantageously the amorphous porous particles of the present invention are much easier to process in food recipes, for example chocolate recipes compared to conventional sugar.

Advantageously the aerated or porous structure of the amorphous porous particles of the present invention retain their structural integrity (for example their closed porosity) even when undergoing heavy processing for example conching during chocolate manufacture.

It has been surprisingly found by the inventors that the majority of the internal closed porosity of the amorphous porous particles of the present invention survives, more particularly that the particles retain at least 20% closed porosity after chocolate manufacturing.

Without being bound by theory it is believed that particles comprising sugar in the amorphous state and having porosity (particularly internal closed porosity) provide a material which dissolves more rapidly than crystalline sugar particles of a similar size. This rapid dissolution in the oral cavity when consumed leads to an enhanced sweetness perception and ensures that more of the sugar is dissolved and reaches the tongue rather than being swallowed untasted.

In a further aspect of the present invention there is provided a sugar replacement composition suitable for partial or whole replacement of sugar in foodstuffs.

Advantageously, the present invention provides replacement of sugar in foodstuffs but still achieving the same or similar level of sweetness. The present invention makes it possible to completely replace sugar in a foodstuff, for example a chocolate product, with the amorphous porous particles of the present invention, achieving at least 65% sugar reduction in one aspect of the present invention.

Advantageously the amorphous porous particles of the present invention can be used as a natural low calorie sugar alternative. Thus, the amorphous porous particles of the present invention provide the reduction of sugar in food products without the need to use artificial sweeteners and/or conventionally known bulking agents.

BRIEF DESCRIPTION OF THE DRAWINGS

Additional features and advantages of the present invention are described in, and will be apparent from, the description of the presently preferred embodiments which are set out below with reference to the drawings in which:

FIGS. 1a, 1b, 1c are cryo-scanning electron microscopy images representing the microstructure of a conventional fat based confectionery composition magnified 500 times, 1000 times and 2000 times respectively. Milk powder particles are indicated at (1), Sucrose crystals at (2), and cocoa butter solids at (3).

FIGS. 2a, 2b, 2c are cryo-scanning electron microscopy images representing the microstructure of a fat based confectionery sample produced according to the present invention magnified 500 times, 1000 times and 2000 times respectively. Amorphous porous particles according to the present invention which are fractured showing the internal aerated structure are indicated at (4).

DETAILED DESCRIPTION OF THE INVENTION AND THE PREFERRED EMBODIMENTS

Figure 1A:
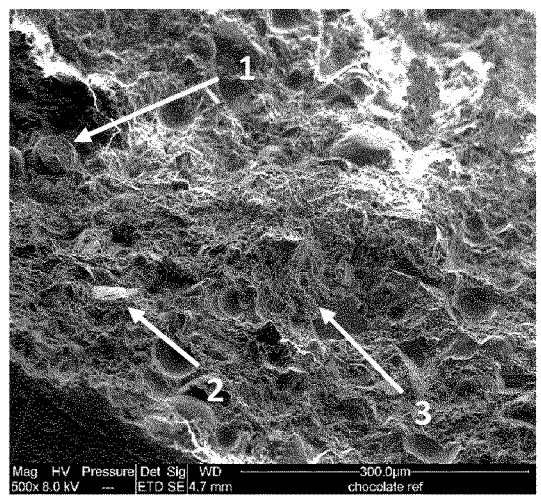
FIGS. 1a-1c show cryo-scanning election microscopy images of the internal structure of a conventional state of the art fat based confectionery product. The microstructures labelled (1) are milk powder, the microstructures labelled (2) are sucrose crystals, and the microstructures labelled (3) are cocoa butter solids.
Figure 1B:
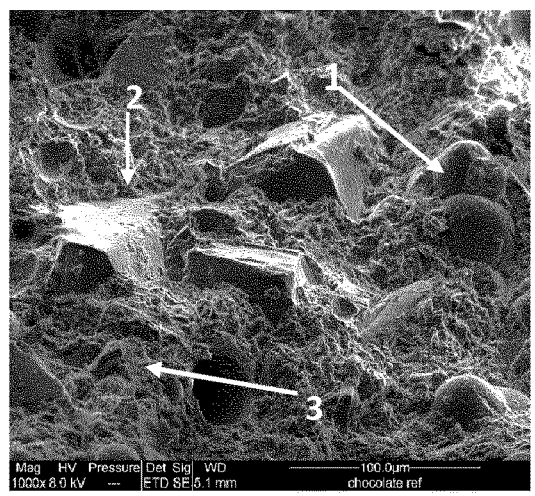
Figure 1C:
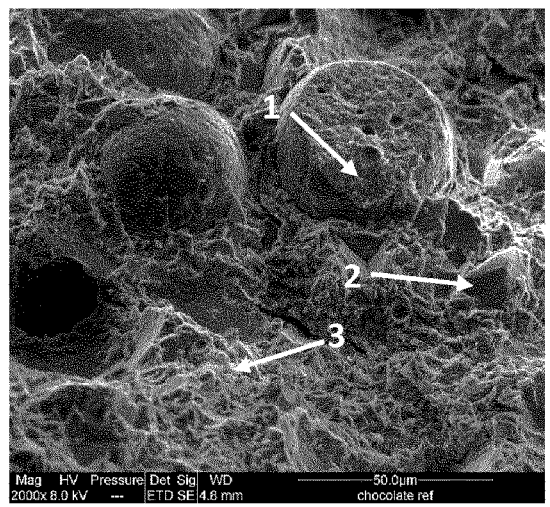
Figure 2A:
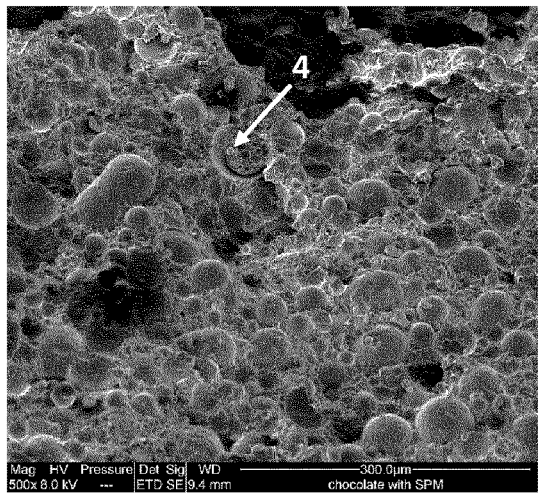
FIGS. 2a-2c show cryo-scanning electron microscopy images of the internal structure of a fat based confectionery product produced using the methods of the present invention. The microstructures labelled (4) represent the amorphous porous particles according to the present invention which are fractured showing the internal aerated structure produced according to the present invention. A person skilled in the art can easily detect the differences between the conventional product and the product made according to the methods of the present invention.
Figure 2B:
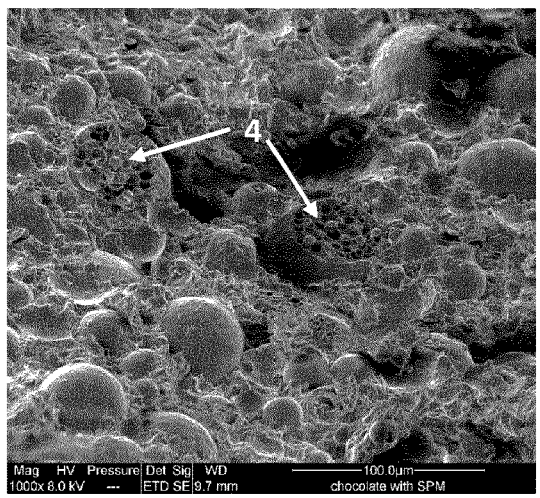
Figure 2C:
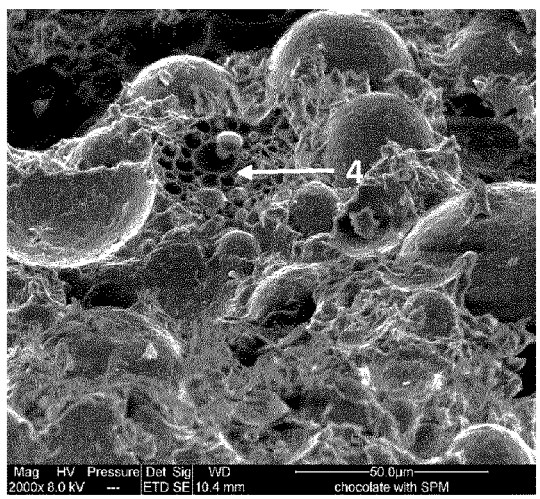

According to the present invention the term 'amorphous' as used herein is defined as being essentially free of crystalline material and should be interpreted in line with conventional understanding of the term.

According to the present invention the term glass transition temperature (Tg) as used herein is to be interpreted as is commonly understood, as the temperature at which an amorphous solid becomes soft upon heating or brittle upon cooling. The glass transition temperature is always lower than the melting temperature (Tm) of the crystalline state of the material. An amorphous material can therefore be conventionally characterised by a glass transition temperature, denoted Tg.

Several techniques can be used to measure the glass transition temperature and any available or appropriate technique can be used, including differential scanning calorimetry (DSC) and dynamic mechanical thermal analysis (DMTA)

In a preferred embodiment of the present invention the amorphous porous particles are characterised as having a glass transition temperature of at least 40° C. or higher, preferably at least 50° C. or higher and more preferably at least 60° C. or higher.

Advantageously in contrast to prior art solutions, the amorphous porous particles of the present invention are less hygroscopic making such material easier to handle and incorporate into conventional preparations of foodstuffs such as for example chocolate manufacture. As shown in the figures, amorphous microstructures can be observed in for example a chocolate compositions prepared according to the present invention compared to a reference sample of a chocolate product comprising normal sugar depicted by the presence of crystalline structures.

According to the present invention the term porous as used herein is defined as multiple non-interconnected small pores or voids or interstices that allow air or liquid to pass through. In the context of the present invention porous is also used to describe the aerated nature of the amorphous particles of the present invention.

In the present invention the term porosity as used herein is defined as a measure of the empty spaces (or voids or pores) in a material and is a ratio of the volume of voids to total volume of the mass of the material between 0 and 1, or as a percentage between 0 and 100%

Porosity can be measured by means known in the art. For instance, the particle porosity can be measured by the following equation:

$$\text{Porosity} = Vp - Vcm/Vp \times 100 \text{ wherein } Vp \text{ is the Volume of the particle and } Vcm \text{ is the volume of the matrix or bulk material.}$$

According to the present invention the term closed or internal porosity as used herein refers in general terms to the total amount of void or space that is trapped within the solid. As can be seen in the figures, fragmented amorphous porous particles of the present invention show the internal micro structure wherein the voids or pores are not connected to the outside surface of the said particles. In the present invention the term closed porosity is further defined as the ratio of the volume of closed voids or pores to the particle volume.

Increasing the porosity of the amorphous particles increases their dissolution speed in water (see Example 5). This increased dissolution speed enhances the sweetness impact of the particles. However, increasing the porosity of the particles also increases their fragility. It is advantageous that the porous amorphous particles of the present invention exhibit closed porosity. Particles with closed porosity, especially those with many small spherical pores, are more robust than particles with open pores, as the spherical shapes with complete walls distribute any applied load evenly. When added to a fat-based confectionery material, closed porosity has a further advantage over open porosity in that fat does not penetrate inside the particle. This penetration inside the particles would reduce the "free" fat available to coat all the particles in the fat-based confectionery material and lead to an increase in viscosity.

In a preferred embodiment of the present invention, the amorphous porous particles have a closed porosity of between 15 to 80%, preferably 20 to 70%, more preferably 20 to 60%.

In a further preferred embodiment, the amorphous porous particles of the present invention have a closed porosity of between 40 to 60%, more preferably 50 to 60%.

The amorphous porous particles of the invention may have a normalized specific surface of between 0.10 and 0.18 m$^{-1}$, for example between 0.12 and 0.17 m$^{-1}$. The amorphous porous particles of the invention may have a normalized specific surface of between 0.10 and 0.18 m$^{-1}$ (for example between 0.12 and 0.17 m$^{-1}$) and a particle size distribution D90 of between 30 and 60 μm.

$$\text{Normalized specific surface} = \frac{\text{interstitial surface area of pores} + \text{external surface area of material}}{\text{solid volume of material}}$$

According to the present invention the term density as used herein is defined in conventional terms as the volumetric mass density of a substance and this is the mass per unit volume of a material. Density should be interpreted in line with conventional understanding of the term.

In the context of the present invention, the term Bulk density as used herein refers to in conventional terms the weight of a unit volume of a loose material such as powder, to the same volume of water, and is typically expressed as kilograms per cubic metre (kg/cm$^3$) or g/cm$^3$ In a preferred embodiment of the present invention the amorphous porous particles of the present invention have a density of between 0.3 to 1.5 g/cm$^3$, preferably 0.5 to 1.0 g/cm$^3$, more preferably 0.6 to 0.9 g/cm$^3$ As previously described, the amorphous and porous nature of the particles leads to faster dissolution in the mouth. This not only enhances sweetness impact but is believed to make the particles less easily detected by the tongue and palate. Advantageously the highly porous and amorphous nature of the particles of the present invention provides an enhanced sweetness and attractive mouthfeel, particularly in fat based confectionery products where the prior art disadvantages associated with replacing sugar with conventional bulking agents usually leads to poor organoleptic qualities, such as grittiness and lack of sweetness.

According to the present invention the term particle size as used herein is defined as D90. The D90 value is a common method of describing a particle size distribution. The D90 is the diameter where 90% of the mass of the particles in the sample have a diameter below that value. In the context of the present invention the D90 by mass is equivalent to the D90 by volume. The D90 value may be measured for example by a laser light scattering particle size analyser. Other measurement techniques for particle size distribution may be used depending on the nature of the sample. For example, the D90 value of powders may conveniently be measured by digital image analysis (such as using a Camsizer XT) while the D90 value of particles comprised within a fat continuous material such as chocolate may be measured by laser light scattering.

The amorphous porous particles of the present invention may have a diameter D90 of less than 90 microns, preferably less than 80 microns, more preferably less than 70, or even more preferentially less than 60 microns.

In a most preferred embodiment the D90 size of the amorphous porous particles of the present invention is between 15 and 90 microns, preferably 20 and 70 microns, more preferably 30 and 65 microns, even more preferentially between 35 and 55 microns. In a further preferred embodiment, the amorphous porous particles of the present invention have been refined.

In the present specification. All percentages are expressed by weight (wt %) unless otherwise specified.

According to the present invention the term sugar as used herein refers to as is conventionally understood a sweet crystalline substance obtained from various plants, especially sugar cane and sugar beet, and used as a sweetener in food and drink. In the context of the present invention sugar is defined as and includes all mono, di and oligo-saccharides for example sucrose, fructose, glucose, dextrose, galactose, allulose, maltose, high dextrose equivalent hydrolysed starch syrup, xylose, and combinations thereof. Accordingly, the sugar comprised within the amorphous porous particles according to the invention may be selected from the group consisting of sucrose, fructose, glucose, dextrose, galactose, allulose, maltose, high dextrose equivalent hydrolysed starch syrup xylose, and any combinations thereof.

In a preferred embodiment the amorphous porous particles of the present invention comprise sugar in the amount of 5 to 70%, preferably 10 to 50%, even more preferably 20 to 40%.

In one preferred embodiment the amorphous porous particles of this invention comprise at least 70% sugar.

According to the present invention the term bulking agent as used herein refers to as is conventionally understood a food additive that increases food volume or weight without impacting the utility or functionality of a food. In a particularly preferred embodiment of the present invention the bulking agents of the present invention are low or non-calorific additives which impart bulk and provide advantageously healthier alternatives to for example sugar.

According to conventional understanding bulking agents may be used to partially or completely replace high-caloric ingredients, such as sugar so as to prepare an edible formulation with a reduction in calories. Additionally, the bulking agents are useful as a source of soluble fibre to be incorporated into foods and, unlike sugar, are non-cariogenic.

In an embodiment, the amorphous porous particles of the present invention comprise a bulking agent in the amount of 5 to 70%, for example 10 to 40%, for further example 10 to 30%, for still further example 40 to 70%.

In one embodiment, the amorphous porous particles of the present invention comprise 10 to 25% of the bulking agent.

According to the present invention the bulking agent may be selected from the group consisting of polyols (sugar alcohols for example isomalt, sorbitol maltitol, mannitol, xylitol, erythritol ad hydrogenated starch hydrolysates) guar gum, psyllium husk, carnuba wax, glycerin, beta glucan, polysaccharides (such as starch or pectin for example), dietary fibres (including both insoluble and soluble fibres), polydextrose, methylcellulose, maltodextrins, inulin, milk powder (for example skimmed milk powder), whey, demineralised whey powder, dextrins such as soluble wheat or corn dextrin (for example Nutriose®), soluble fibre such as Promitor® and any combination thereof.

In a preferred embodiment of the present invention the bulking agent may be selected from the group consisting of maltodextrins, milk powder (for example skimmed milk powder (SMP)), demineralised whey powder (DWP), soluble wheat or corn dextrin (for example Nutriose®), polydextrose, soluble fibre such as Promitor® and any combinations thereof.

The amorphous porous particles of the invention may comprise (for example consist on a dry basis of) sucrose and skimmed milk, the sucrose being present at a level of at least 30% in the particles. The ratio of sucrose to skimmed milk may be between 0.5 to 1 and 2.5 to 1 on a dry weight basis, for example between 0.6 to 1 and 1.5 to 1 on a dry weight basis. The skimmed milk may have a fat content below 1.5% on a dry weight basis, for example below 1.2%. The components of skimmed milk may be provided individually and combined with sucrose, for example the amorphous porous particles of the invention may comprise sucrose, lactose, casein and whey protein. Sucrose and skimmed milk provide an amorphous porous particle which has good stability against recrystallization without necessarily requiring the addition of reducing sugars or polymers. For example the amorphous porous particles of the invention may be free from reducing sugars (for example fructose, glucose or other saccharides with a dextrose equivalent value. The dextrose equivalent value may for example be measured by the Lane-Eynon method). For further example the amorphous porous particles of the invention may be free from oligo- or polysaccharides having a three or more saccharide units, for example maltodextrin or starch.

The amorphous porous particles of the invention may have a moisture content between 0.5 and 6%, for example between 1 and 5%, for further example between 1.5 and 3%.

In an alternative embodiment of the present invention the amorphous porous particles may comprise no sugar and 100% bulking agent.

According to the present invention in a preferred embodiment the amorphous porous particles of the present invention comprise a surfactant or stabilisers which may be necessary to obtain the particles of the present invention with closed pores.

The amorphous porous particles of the invention may comprise for sugar, bulking agent and surfactant, all distributed throughout the continuous phase of the particles. Higher concentrations of the surfactant may be present at the gas interfaces than in the rest of the continuous phase, but the surfactant may be present in the continuous phase inside the particles, not just coated onto the exterior.

In a preferred embodiment, the amorphous porous particles of the present invention comprise a surfactant in the amount of 0.5 to 15%, preferably 1 to 10%, more preferably 1 to 5%, even more preferentially 1 to 3%.

According to the present invention the surfactant may be selected from the group consisting of lecithin, whey proteins, milk proteins, sodium caseinate, lysolecithin, fatty acid salts, lysozyme, sodium stearoyl lactylate, calcium stearoyl lactylate, lauroyl arginate, sucrose monooleate, sucrose monostearate, sucrose monopalmitate, sucrose monolaurate, sucrose distearate, sorbitan monooleate, sorbitan monostearate, sorbitan monopalmitate, sorbitan monolaurate, sorbitan tristearate, PGPR, PGE and any combinations thereof.

In a preferred embodiment of the present invention the surfactant may be sodium caseinate or lecithin.

It will be well understood in the art that in embodiments according to the present invention wherein the bulking agent is derived from milk powder such as skimmed milk powder or demineralised whey powder, sodium caseinate for example is inherently present.

The amorphous porous particles of the invention may be coated, for example they may be coated in a thin layer of fat such as cocoa butter. A thin layer of fat further enhances the stability of the particles during transport and storage.

The porous nature of the amorphous particles of the invention may lead to them being lighter in colour than solid crystalline materials such as sucrose crystals. This can be counteracted by the addition of opaque or coloured materials. The amorphous porous particles of the invention may comprise coloured ingredients, for example caramelized sugars or permitted food colours, for example natural food colours.

According to the present invention there is provided a process for preparing the amorphous porous particles of the present invention.

In a preferred embodiment the amorphous porous particles of the present invention are prepared according to a conventional spray-drying methods as here below described.

In a preferred aspect of the present invention there is provided a process to prepare the amorphous porous particle of the present invention comprising in its broad aspects the steps of:
  subjecting a mixture comprising sugar, bulking agent and surfactant to high pressure, preferably 50 to 300 bar, more preferably 100 to 200 bar;
  adding gas to the mixture;
  spraying and drying the mixture to form amorphous porous particles; and
  reducing the particle size of the amorphous porous particles.

The gas may be added before the mixture has been pressurised. In that case the gas may be added at low pressure into the mixture and then pressurised at a later stage in the process line before spray-drying, for example it may be pressurised such that it dissolves in the mixture. However, the process of compressing a gas/liquid mixture can be difficult to control, so preferably the mixture is pressurised before gas is added, in other words gas may be added to the pressurised mixture.

Accordingly the process to prepare the amorphous porous particle of the present invention may comprise the steps of:
  a) subjecting a mixture comprising sugar, bulking agent and surfactant to high pressure, preferably 50 to 300 bar, more preferably 100 to 200 bar
  b) adding gas to the pressurised mixture and
  c) spraying and drying the mixture to form amorphous porous particles and
  d) reducing the particle size of the amorphous porous particles.

In a preferred embodiment of the present invention, the mixture comprising sugar, bulking agent and surfactant may be mixed with 30% water, preferably 40% water and more preferably 50% water until full dissolution is achieved.

In a preferred embodiment of the present invention the mixture comprising sugar, bulking agent and surfactant is subjected to high-pressure, for example a pressure greater than 2 bar, typically 50 to 300 bar, preferably 100 to 200 bar, more preferably 100 to 150 bar.

The gas is preferably dissolved in the mixture before spraying, the mixture comprising dissolved gas being held under high pressure up to the point of spraying. Typically the gas is selected from the group consisting of nitrogen, carbon dioxide, nitrous oxide and argon. The gas may be air. Preferably the gas is nitrogen and it is added for as long as it takes to achieve full dissolution of gas in the said mixture. For example the time to reach full dissolution may be at least 2 minutes, for example at least 4 minutes, for further example at least 10 minutes, for further example at least 20 minutes, for further example at least 30 minutes.

The drying may be spray-drying, for example the spraying and drying may be spray-drying. The pressurised mixture may be sprayed dried according to well-known prior art conventional spray-drying techniques. A skilled person in the art would recognise all the obvious embodiments of using the conventional spray-drying methods well known in the art.

In an alternative embodiment it is plausible that other known procedures may be used to carry out the process of the present invention for example, foam drying, freeze drying, tray drying, fluid bed drying and the like.

The step of reducing the particle size of the amorphous particles may be performed as part of processing the particles into a food product. For example, the particles may be used as an ingredient for the manufacture of a fat based confectionery product and their particle size reduced during the refining process of the fat based confectionery, such as during roll refining. Spray-drying processes are typically adjusted to create agglomerated particles as these are easier to store, transport and handle in factories without issues such as dust generation or caking. However, large agglomerates may lead to undesirable mouthfeel attributes such as powdery-ness and grittiness and so, in a product such as a fat based confectionery product it is generally desirable to reduce the particle size of the solid ingredients. It is advantageous that the porosity of the amorphous particles of the invention is able to survive size reduction processes used in chocolate manufacture such as roll refining. Pores of approximately spherical shape provide a strong structure to the particles and having multiple small closed pores means that the particles can be fractured without significant loss of internal porosity.

In a further aspect the present invention also provides for amorphous porous particles obtained by the said method as described herein.

According to a general aspect of the present invention, the amorphous porous particles of the present invention have a wide range of utilities, including all of the applications in dry food mixes for which sugar is normally employed. For instance, said particles of the present invention may be used in a variety of food products for example, a confectionery product, a culinary product, a dairy product, a nutritional formula, a breakfast cereal or an ice-cream.

In one preferred aspect of the present invention the focus is on the use of the amorphous porous particles to replace sugar in confectionery products (including both fat and sugar based confectionery products). In an embodiment, the invention provides a food product wherein amorphous porous particles have been refined. In the context of the present invention, the term "refined" refers to material which has been subjected to a refining process to reduce the particle size of the material's solids. In the manufacture of fat-based confectionery products, processes such as roll refining and air classifier milling are used to refine the confectionery mass.

In the present invention the term 'confectionery product' or 'fat-based confectionery product' is to be understood as meaning chocolate product, chocolate-like product (eg, comprising cocoa butter replacers, cocoa butter equivalents or substitutes), a coating chocolate, a chocolate-like coating product, a coating chocolate for ice-creams, a chocolate-like coating for ice-cream, a praline, a chocolate filling, a fudge, a chocolate cream, an extruded chocolate product or the like. The fat-based confectionery product may be a white chocolate; comprising sugar, milk powder and cocoa butter but not dark cocoa material. The product may be in the form of an aerated product, a bar, or a filling, among others. The chocolate products or compositions can be used as coatings, fillers, enrobing compositions or other ingredients in a finished or final food or confectionery product. The confectionery product of the invention may further contain inclusions such as nuts, cereals, and the like.

In an alternative embodiment confectionery product also includes non-fat based confectionery products such as conventional sugar confectionery.

According to the knowledge of the skilled person the confectionery products comprising the amorphous porous particles of the present invention may also be used as a filling between biscuits (for example wafers), as part of a coating or as a coating. It can also comprise inclusions such as nuts, puffed cereal, chocolate chips, sugar chips, fruit pieces, caramel pieces, biscuits, wafers, creams or the like.

In another embodiment of the present invention there is provided a fat based confectionery composition comprising
a) Cocoa powder or cocoa liquor or cocoa butter or cocoa butter equivalents or any combinations thereof and
b) 5 to 60 wt % of amorphous porous particles according to the present invention.

In a preferred embodiment of the present invention there is provided a fat based confectionery composition comprising
a) Cocoa powder or cocoa liquor or cocoa butter or cocoa butter equivalents or any combinations thereof and
b) 5 to 60 wt % of amorphous porous particles
wherein said amorphous porous particles comprise sugar, a bulking agent and a surfactant, and wherein said amorphous porous particles have a closed porosity of between 20 to 60%.

The invention may provide a fat based confectionery composition comprising
a) cocoa powder or cocoa liquor or cocoa butter or cocoa butter equivalents or any combinations thereof and
b) 5 to 60% of amorphous porous particles according to the present invention.
wherein said amorphous porous particles comprise (for example consist on a dry basis of) sucrose and skimmed milk, the sucrose being present at a level of at least 30% in the particles, the ratio of sucrose to skimmed milk being between 0.5 to 1 and 2.5 to 1 on a dry weight basis, for example between 0.6 to 1 and 1.5 to 1 on a dry weight basis. It is advantageous that the fat based confectionery composition may comprise only ingredients commonly found in fat based confectionery products such as chocolate. The amorphous porous particles comprised within the fat based confectionery may be free from reducing sugars and/or free from oligo- or polysaccharides having a three or more saccharide units.

In a preferred embodiment to the present invention the fat based confectionery product comprises 5 to 60% of the amorphous porous particles, preferably 10 to 50%, more preferably 20 to 40%.

All terms such as amorphous, porous, sugar, surfactant, bulking agent and sphericity are as previously defined.

In a preferred embodiment the fat based confectionery product comprises amorphous porous particles having a glass transition temperature of at least 40° C. or higher. In another preferred embodiment the fat based confectionery product comprises amorphous porous particles have a D90 particle size below 60 microns, for example between 30 and 60 microns.

According to the present invention the fat based confectionery product comprising the amorphous porous particles of the present invention is prepared according to conventional chocolate making processes as will be well known and obvious to a person skilled in the art.

In one preferred embodiment of the present invention there is provided a process of making a fat based confectionery product comprising amorphous porous particles comprising the steps of:
- subjecting a mixture (for example an aqueous mixture) comprising sugar, bulking agent and surfactant to high pressure, preferably 50 to 300 bar, more preferably 100 to 200 bar;
- adding gas to the mixture;
- spraying and drying the mixture to form amorphous porous particles;
- mixing the amorphous porous particles with fat and optionally ingredients selected from the group consisting of milk powder, cocoa liquor, crystalline sugar, lecithin and combinations of these, preferably at a temperature between 35 and 55° C. for 2 to 20 minutes;
- refining the resulting mixture to reduce the particle size of the amorphous porous particles; and
- mixing the refined mixture with further fat and optionally lecithin and liquefying.

The gas may be added before the mixture has been pressurised. In that case the gas is pressurised together with the mixture, for example it may be pressurised such that it dissolves in the mixture. Preferably the mixture is pressurised before gas is added.

Accordingly the process of making a fat based confectionery product comprising amorphous porous particles of the present invention may comprise the steps of:
a) subjecting a mixture (for example an aqueous mixture) comprising sugar, bulking agent and surfactant to high pressure, preferably 50 to 300 bar, more preferably 100 to 200 bar
b) adding gas to the pressurised mixture
c) spraying and drying the mixture to form amorphous porous particles
d) mixing the amorphous porous particles with fat and optionally milk powder, cocoa liquor, crystalline sugar and lecithin, preferably at a temperature between 35 and 55° C. for 2 to 20 minutes
e) refining the resulting mixture to reduce the particle size of the amorphous porous particles and
f) mixing the refined mixture with further fat and optionally lecithin and liquefying.

The fat may for example be cocoa butter, cocoa butter equivalent or cocoa butter replacer. The fat may be cocoa butter. Some or all of the milk powder, cocoa liquor and crystalline sugar may be replaced by chocolate crumb. In a preferred embodiment the liquefaction is carried out by conventional means well known to a person skilled in the art and refers to conching, a standard process in chocolate manufacture. In a preferred embodiment, 15 to 30% of the total fat present after liquefying is used in step (f). The reduction of particle size may be such that the resulting amorphous porous particles have a D90 particle size distribution of between 30 and 60 microns, for example between 35 and 50 microns.

Roll refiners may be used to refine the mixture, for example a combination of 2-roll and 5-roll refiners may be used to refine the mixture. The larger the size of the amorphous porous particles compared to the minimum roller gap during refining, the more likely the amorphous particles are to be broken by the roll refining process. Agglomerated powders provide advantages as ingredients in terms of flowability and lower dustiness. The amorphous porous particles mixed with fat before refining may be in the form of an agglomerated powder. For example, the amorphous porous particles may be amorphous porous particles according to the invention agglomerated as part of a spray-drying process, for example an open top spray drier with secondary air recirculation to trigger particle agglomeration. The agglomerated particles may have a particle size distribution D90 of between 120 and 450 µm. The size of spray-dried particles before agglomeration or without agglomeration may be increased by increasing the aperture size of the spray-drying nozzle (assuming the spray-drier is of sufficient size to remove the moisture from the larger particles).

Advantageously, the harsh processing conditions of the chocolate making process such as refining does not destroy the porosity of the particles of the present invention, for example the particle size of agglomerated particles described above could be reduced by roller refining whilst still retaining much of their original closed porosity. For example, after refining the particles may retain at least 20%, 30%, 40% or 50% of their initial closed porosity, for further example the particles after refining may have a closed porosity between 20 and 60%. This was reflected in the food products such as the lighter coloration of for example chocolate products comprising the said particles of the present invention. Particles formed by spray drying are generally spherical in form. When formed into agglomerates, the agglomerated particles generally retain convex rounded surfaces composed of the surfaces of individual spherical particles. Refining spherical or agglomerated spherical particles causes fractures in the particles which leads to the formation of non-rounded surfaces. The refined particles according to the invention may have less than 70% of their surface being convex, for example less than 50%, for further example less than 25%.

After refining, less than 30% of the particles may be substantially spherical, for example less than 20% may be substantially spherical, for example less than 10% may be substantially spherical, for example less than 5% may be substantially spherical, for example essentially none of the particles may be substantially spherical. According to the present invention the term sphericity as used herein refers to in conventional terms a measure of how spherical (round) an object is. In the context of the present invention sphericity refer to the sphericity of the particles and is defined as Sphericity=$4\pi A/P^2$ wherein A is defined as the measured area covered by a particle projection and P is the measured perimeter of a particle projection.

For instance, an ideal sphere would have an expected the sphericity of 1. It is to be commonly understood however that a high degree of sphericity can still be achieved with values less than 1. For example a value between 0.6 and 1 for an object or particle would be considered substantially spherical.

Imaging experiments show clearly that the particles of the present invention retain significant porosity after the chocolate preparation steps. Sensory evaluations performed showed good tasting qualities and light and creamy texture and mouthfeel indicative of particle porosity remaining intact within the product.

The amorphous porous particles may comprise (for example consist on a dry basis of) sucrose and skimmed milk, the sucrose being present at a level of at least 30% in the particles, the ratio of sucrose to skimmed milk being between 0.5 to 1 and 2.5 to 1 on a dry weight basis, for example between 0.6 to 1 and 1.5 to 1 on a dry weight basis.

According to the present invention the amorphous porous particles in one embodiment are in the form of a powder. In an alternative embodiment, the said amorphous porous particles of the present invention may also be agglomerated by methods known in the art to obtain material with further improved handling properties such as flowability and lower dustiness.

In the following description reference is made to the use of the amorphous porous particles of the present invention as bulk sugar replacers in fat based confectionery products as a preferred embodiment. The amorphous porous particles of the present invention may however also be used in a wide range of food products as aforementioned.

In the present invention the term bulk sugar replacer as used herein refers to a low or no calorie sugar substitute that can be substituted at a weight to weight and/or volume to volume basis for sugar. As aforementioned, the combination of the amorphous highly porous sugar particles and bulking agent provide a synergistic effect whereby a further bulking effect is achieved through aeration. In one aspect of the present invention this advantageously provides up to at least 70% sugar reduction in a food product for example a fat based confectionery product. Preferably at least 65% of sugar may be reduced from a food product such as a fat based confectionery product.

Preferably, between 5 to 70% of sugar may be reduced or removed from a food product such as a fat based confectionery product.

In an embodiment of the invention where the amorphous porous particles are comprised within a fat based confectionery composition and the particles comprise (for example consist on a dry basis of) sucrose and skimmed milk, increasing the proportion of skimmed milk to sucrose reduces the amount of sucrose in the overall fat based confectionery composition. This can be advantageous, as many consumers would welcome a good tasting fat based confectionery with reduced sugar, and appreciate a high milk content. Reducing the proportion of sucrose in the particles reduces their sweetness directly, but it also reduces the dissolution speed of the particles which further reduces sweetness impact in the mouth. However, the inventors have found that by increasing the porosity of the particles, in particular the closed porosity of the particles, they can increase the dissolution speed and so counteract that reduction of sweetness. Accordingly the invention may provide a fat based confectionery composition comprising a) cocoa powder or cocoa liquor or cocoa butter or cocoa butter equivalents or any combinations thereof and
b) 5 to 60% (for example 20 to 55%) of amorphous porous particles according to the present invention.

wherein said amorphous porous particles have a moisture content of between 1% and 5% (for example between 2% and 3%), comprise sucrose and skimmed milk at a level of at least 95% of the particles on a dry basis (for example at least 98%), have a ratio of sucrose to skimmed milk between 0.5:1 and 0.6:1 and have a closed porosity between 20% and 60%, for example between 25% and 50%, for further example between 25% and 40%. The amorphous porous particles may have a D90 particle size distribution of between 30 and 60 microns, for example between 35 and 50 microns. The inventors have investigated the impact on the stability of the amorphous porous particles of altering the ratio of sucrose to skimmed milk powder (see example 5). There is a significant decrease in stability when the ratio of sucrose to skimmed milk powder exceeds 0.6:1. Therefore, when seeking to reduce the sucrose content in a food product by replacing crystalline sucrose with amorphous porous particles of the invention containing sucrose and skimmed milk an optimum ratio to use is around 0.66:1.

In a preferred embodiment of the present invention the amorphous porous sugar particles of the present invention may be used as a bulk sugar replacer in a food product. The amorphous porous sugar particles of the present invention may be used to reduce the sugar content of a food product. For example the amorphous porous sugar particles may be used to reduce the sugar content (for example the sucrose content) of a fat-based confectionery product by between 50 and 70% on a volume basis, or to reduce the sugar content (for example the sucrose content) of a fat-based confectionery product by between 10 and 35% on a mass basis.

In another embodiment of the present invention the amorphous porous sugar particles are preferably used in a food product such as a confectionery product, a culinary product, a dairy product, a nutritional formula, a breakfast cereal or an ice-cream.

In an embodiment of the present invention there is provided a sweetener composition consisting of amorphous porous particles comprising, sugar, a bulking agent and a surfactant, wherein said amorphous porous particles have a closed porosity of between 20 to 60%.

Ranges

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Percentages

Unless otherwise specified % in the present description correspond to wt %

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

Substantially

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

The term "comprising" as used herein will be understood to mean that the list following is non exhaustive and may or may not include any other additional suitable items, for example one or more further feature(s), component(s), ingredient(s) and/or substituent(s) as appropriate. Thus the words "comprise", "comprising" and the like are to be construed in an inclusive sense as opposed to an exclusive or exhaustive sense; that is to say, in the sense of "including, but not limited to". It should be noted that embodiments and features described in the context of one of the aspects of the present invention also apply to the other aspects of the invention.

Experimental Section

Determination of Glass Transition Temperature

Glass transition temperatures (Tg) were measured by Differential Scanning calorimetry (TA Instrument Q2000). A double scan procedure was used to erase the enthalpy of relaxation and get a better view on the glass transition. The scanning rate was 5° C./min. The first scan was stopped approximately 30° C. above Tg. The system was then cooled at 20° C./min. The glass transition was detected during the second scan and defined as the onset of the step change of the heat capacity.

Determination of Structures Using Cryo-Scanning Electron Microscopy

Cryo-Scanning Electron Microscopy (Cryo-SEM) and X-ray Tomography (μCT) are used to investigate the microstructure of the amorphous porous particles of the present invention within a fat based food matrix.

A 1 cm$^3$ piece of sample was glued into a Cryo-SEM sample holder using TissueTek. It was rapidly frozen in slushy nitrogen prior to its transfer into the cryo-preparation unit Gatan Alto 2500 at −170° C. The frozen sample was fractured using a cooled knife, making its internal structure accessible. The fracture was not performed when the external surface of the chocolate was analyzed. A slight etching of superficial water was performed in the preparation unit for 15 min at −95° C., followed by sample stabilization at −120° C. A final coating was done by an application of a 5 nm platinum layer onto the surface. For visualization a FEI Quanta 200 FEG at 8 kV in high vacuum mode was used.

Determination of Sphericity

Sphericity was measured by the Camsizer XT. It is an opto-electronic instrument, allowing the measurement of the size and shape parameters of powders, emulsions and suspensions. The technique of digital image analysis is based on the computer processing of a large number of sample's pictures taken at a frame rate of 277 images/seconds by two different cameras, simultaneously. The sample is lightened by two pulsed LED light sources during the measurement. Particle size and particle shape (including sphericity) are analyzed with a user-friendly software which calculates the respective distribution curves in real time.

The perimeter of a particle projection and the covered area were measured to obtain the sphericity.

| Amorphous porous particles (powder) | Sphericity |
|---|---|
| Sucrose:Promitor 70:30 (+3% Sodium Caseinate) (Example 2) | 0.852 |
| Sucrose:DWP 70:30 (Example 3) | 0.877 |
| Sucrose:SMP 70:30 (Example 4) | 0.880 |

Particle Size

The particle size values given herein may be measured by a Coulter LS230 Particle Size Analyser (laser diffraction) or any other similar machine as known to those skilled in the art. In present invention the term particle size as used herein is defined as D90. The D90 value is a common method of describing a particle size distribution. The D90 is the diameter where 90% of the mass of the particles in the sample have a diameter below that value. The D90 value may be measured for example by a laser light scattering particle size analyser. For example, the particle size of particles comprised within fat based confectionery materials such as chocolate may be measured by laser light scattering. The particle size values of powders may be measured by digital image analysis such as by using a Camsizer XT (Retsch Technology GmbH, Germany).

The invention will now be described in further details in the following non-limiting examples. The following Examples are provided of illustrative purposes only and they are not to be considered in any way limiting to the scope of the present invention.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

It will be appreciated that if (for example in the Examples herein) the weight percentages herein do not add up to 100% (e.g. due to rounding) they can also be considered as recipes where the same numbers for the weight percentage of each ingredient is considered as a relative part by weight.

EXAMPLES

The following examples are illustrative of the products and methods of making the same falling within the scope of the present invention. They are not to be considered in any way limitative of the invention. Changes and modifications can be made with respect to the invention. That is the skilled person will recognise many possible variations in these examples covering a wide range of compositions, ingredients, processing methods and mixtures and can adjust the naturally occurring levels of the compounds of the invention for a variety of applications.

Example 1

Preparation of the amorphous porous particles of the present invention

| Ingredients | Amount (wt %) |
|---|---|
| water | 50 |
| Sucrose | 24.25-38.8 |
| Bulking agent | 11.8-24.25 |
| Sodium caseinate | 1.5 |

All ingredients were weighed separately and then mixed with a polytron PT3000D mixer until full dissolution at room temperature with a speed rate between 6000 and 12000 rpm.

The inlet solution is transferred in a vessel at controlled temperature of 55° C. and is then pumped at 100-130 bar. High pressure nitrogen is injected at 0.5-2 NL/min for at least 10 mins or a least until full dissolution of the gas in the solution is achieved. After a pre-heating at 60 deg C., the solution is spray-dried using a one-stream closed-top spray drier according to the parameters listed in the table below:

| Spray-drying parameters | |
|---|---|
| Nozzle | Alphanumeric (diameter 0.35) |
| Inlet air temperature | 120 deg C. |
| Output temperature | 85 deg C. |
| Drying air volume | 400 m3 |
| Pump pressure | 130 bars |
| Gas injection | 0.5-2 NL/min |
| Solution flowrate | 12 L/h |

A standard reference formulation for a chocolate recipe

| Ingredients | Amount (wt %) |
|---|---|
| Sugar | 46.47 |
| Whole milk powder | 23 |
| Cocoa liquor | 11 |
| Cocoa butter | 19 |
| lecithin | 0.5 |
| vanillin | 0.03 |

A standard process for the preparation of chocolate was employed. All dry ingredients and about 26% of cocoa butter fat is heated at 45 deg C. for 3 mins. After mixing, the resulting paste is passed through a two roller refiner and a five roller refiner to produce flakes with particle sizes ranging between 50 and 55 microns.

After refining, the mixture comprising the refined mass is mixed with the rest of the fat and lecithin to liquefy it at 45 deg C. for 3 mins.

Example 2

A reduced sugar chocolate composition was prepared in the same way as the standard recipe as aforementioned comprising the same ingredients except in place of sugar, the composition Sucrose:Promitor 70:30 and 3% Sodium Caseinate in the form of an amorphous powder was used.

| Ingredients | Amount (wt %) |
|---|---|
| Sucrose:Promitor 70:30 (+3% Sodium Caseinate) | 32 |
| Whole milk powder | 29 |
| Cocoa liquor | 14 |
| Cocoa butter | 24 |
| lecithin | 1 |
| vanillin | 0 |

Example 3

A reduced sugar chocolate composition was prepared in the same way as in example 2 as aforementioned comprising the same ingredients except in place of sugar, the composition Sucrose:DWP 70:30 in the form of an amorphous powder was used.

| Ingredients | Amount (wt %) |
|---|---|
| Sucrose:DWP 70:30 | 27 |
| Whole milk powder | 31 |
| Cocoa liquor | 15 |
| Cocoa butter | 26 |
| lecithin | 1 |
| vanillin | 0 |

Example 4

A reduced sugar chocolate composition was prepared in the same way as in examples 2 to 3 as aforementioned comprising the same ingredients except in place of sugar, the composition Sucrose:SMP 70:30 in the form of an amorphous powder was used.

| Ingredients | Amount (wt %) |
|---|---|
| Sucrose:SMP 70:30 | 32 |
| Whole milk powder | 29 |
| Cocoa liquor | 14 |
| Cocoa butter | 24 |
| lecithin | 1 |
| vanillin | 0 |

Surprisingly it was found that by replacing the sugar with 100% of the amorphous porous particles of the present invention in chocolate recipes as described in the example above provided chocolate samples closely matched the reference sample in terms of texture, flavour and sweetness. Similar results were also obtained for fat based confectionery filling recipes, for example wafer filling recipes.

In addition the samples prepared according to the present invention and comprising the amorphous porous particles instead of sugar showed a strong correlation with additionally desirable flavours such as milky, caramel, vanilla and butter.

Example 5

The effect of altering the composition of the amorphous matrix was examined for different ratios of skimmed milk powder (SMP) and sucrose. The amorphous matrix should be stable against crystallization, for example, in the case of chocolate manufacture the matrix should remain amorphous under the temperature and humidity conditions experienced in the conche. If processing or storage conditions approach those at which the amorphous material passes through the glass transition then there is a possibility that crystallization will occur leading to a collapse of the particles, for example the lactose present in amorphous porous particles of skimmed milk powder and sucrose may crystallize.

Amorphous porous particles with different ratios of sucrose:SMP were produced; 40:60, 50:50, 60:40, 70:30 and compared to pure amorphous sucrose and SMP. The amorphous SMP was spray dried. The amorphous sucrose was obtained by freeze drying (Millrock, US). A solution containing 10% (weight basis) of sucrose was prepared. It was frozen at −40° C. for 6 hours allowing the formation of ice crystals. Primary drying is performed at 150 mTorr. Ice crystals sublimate and leave voids behind leading to a highly porous structure. Secondary drying consists of a temperature ramp from −40° C. to 40° C. at 1° C./hour. During that stage residual water bound to the matrix is removed by desorption leading very low moisture content, typically 1-2% as measured by ThermoGravimetric Analysis.

As the samples initially have different water activity ($a_w$) values the sorption isotherms were drawn to calculated Tg at the same $a_w$.
1) Sorption isotherms were built by collecting samples during short periods of time (i.e. typically over 48 h) stored in two types of desiccators (one for partial drying and one for humidification). The Tg of each sample was obtained by using the second scan of DSC experiment at 5° C./min heating ramp. The first scan should stop at about 30° C. above the $T_g$ in order to avoid relaxation enthalpy interference with $T_g$ measurement. Onset $T_g$ of the product is then determined using a second scan. After 2 h heating at $T_g$+5° C. $a_w$ is measured at 25° C.
2) BET fitting is performed over the data of moisture content as a function of $a_w$ (0.08-0.35) and the Gordon Taylor over the data of Tg as a function of $a_w$ (corresponding range).
   a. Brunauer-Emmett-Teller equation (BET):

$$M_{db}(a_w) = \frac{M_m C a_w}{(1-a_w)[1+(C-1)a_w]}$$

where C is a constant and $M_m$ is the BET monolayer moisture content (on dry basis)
   b. Gordon-Taylor equation (Gordon and Taylor, 1952):

$$T_g = \frac{kwT_{g,water} + (1-w)T_{g,dry}}{kw + k(1-w)}$$

where w is water content on a weight basis, $T_{g,water}$ is the glass-transition temperature of water estimated at −135° C., $T_{g,dry}$ is the glass-transition temperature of sucrose and k is a curvature constant.

Figure 3:
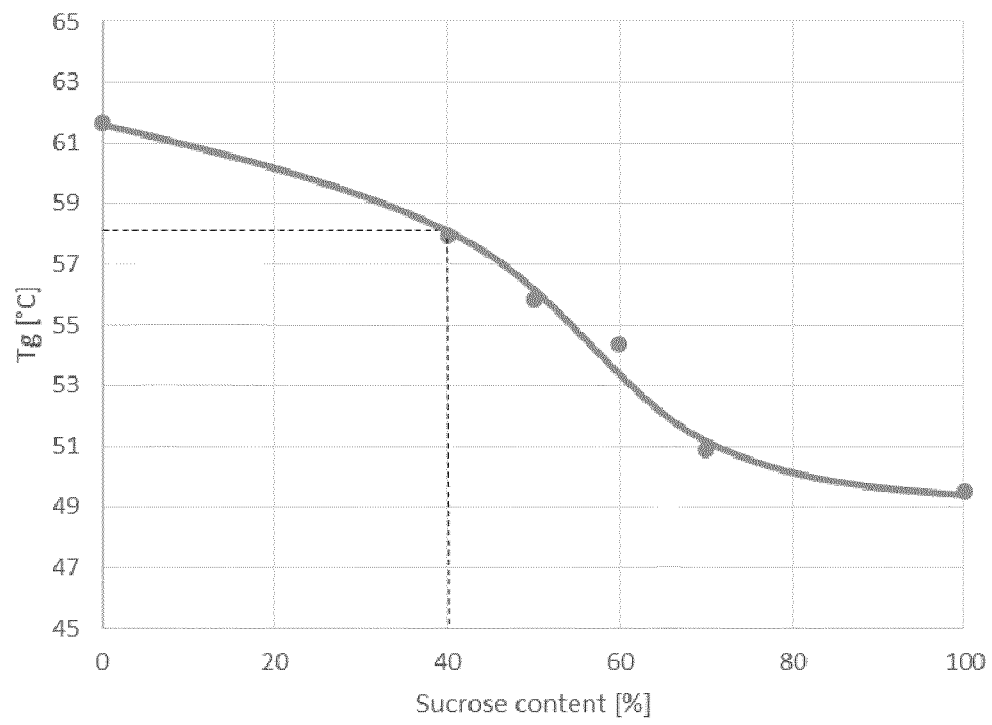
FIG. 3 is a plot of glass transition temperature (Tg/° C.) versus sucrose content for amorphous porous particles of sucrose and skimmed milk powder at 25° C. and a water activity of 0.1.

The glass transition temperature (Tg) is plotted against sucrose content in FIG. 3 for amorphous particles at a water activity of 0.1 and 25° C. It can be seen that there is a much more pronounced decrease in glass transition temperature for increasing sucrose content at or above 40% (a ratio of 0.66:1). This means that there is a significant decrease in stability (against crystallization) when the level of sucrose in an amorphous matrix containing sucrose and skimmed milk powder exceeds 40%. Therefore, when seeking to reduce the sucrose content in a food product by replacing crystalline sucrose with amorphous porous particles of the invention containing sucrose and skimmed milk an optimum proportion to use is around 40% sucrose and 60% skimmed milk powder.

Example 6

The effect of altering porosity and composition on dissolution speed and sweetness impact was investigated. Amorphous porous particles were prepared as in Example 1, with the inlet solution containing 50 wt. % water and 50 wt. % of sucrose+SMP (skimmed milk powder) at the appropriate ratio. No sodium caseinate was added as this is already present in SMP. Particle size distribution was measured using a Camsizer XT (Retsch Technology GmbH, Germany).

| Powder | Ratio sucrose:SMP | Closed porosity | Particle size distribution D90 |
|---|---|---|---|
| A | 70:30 | 50% | 50 μm |
| B | 60:40 | 53% | 53 μm |
| C | 50:50 | 51% | 52 μm |
| D | 40:60 | 57% | 60 μm |
| E | 30:70 | 60% | 55 μm |

Samples with different levels of porosity, but with similar particle size distributions and the same composition were prepared. Sample G was prepared with no gas injection. This produced a very low level of closed porosity (6%). Varying the gas flow up to 2 normal litres per minute allowed increasing levels of closed porosity to be generated.

| Powder | Ratio sucrose:SMP | Closed porosity | Particle size distribution D90 |
|---|---|---|---|
| A | 70:30 | 50% | 50 μm |
| F | 70:30 | 33% | 41 μm |
| G | 70:30 | 6% | 40 μm |

The closed porosity was obtained by measuring the matrix and apparent densities.

The matrix density was determined by DMA 4500 M (Anton Paar, Switzerland AG). The sample was introduced into a U-shaped borosilicate glass tube that is excited to vibrate at its characteristic frequency which depends on the density of the sample. The accuracy of the instrument is 0.00005 g/cm³ for density and 0.03° C. for temperature.

The apparent density of powders was measured by Accupyc 1330 Pycnometer (Micrometrics Instrument Corporation, US). The instrument determines density and volume by measuring the pressure change of helium in a calibrated volume with an accuracy to within 0.03% of reading plus 0.03% of nominal full-scale cell chamber volume.

Closed porosity is calculated from the matrix density and the apparent density, according to the following equation:

$$\text{Closed porosity} = 100 \cdot \left(1 - \frac{\rho_{apparent}}{\rho_{matrix}}\right)$$

The dissolution test was performed as follows. 30.0 g±0.1 g of water (milliQ grade) was placed in a 100 mL beaker (h=85 mm Ø=44 mm) with a magnetic stirrer (L=30 mm Ø=6 mm). The stirring rate was adjusted to 350 rpm and 1.000 g±0.002 g of powder was added in the solution. During the dissolution, the refractive index of the solution was registered each second until a plateau corresponding to complete dissolution was reached. Refractive index was measured using a FISO FTI-10 Fiber Optic Conditioner These experiments were performed at room temperature (23-25° C.).

Figure 4:
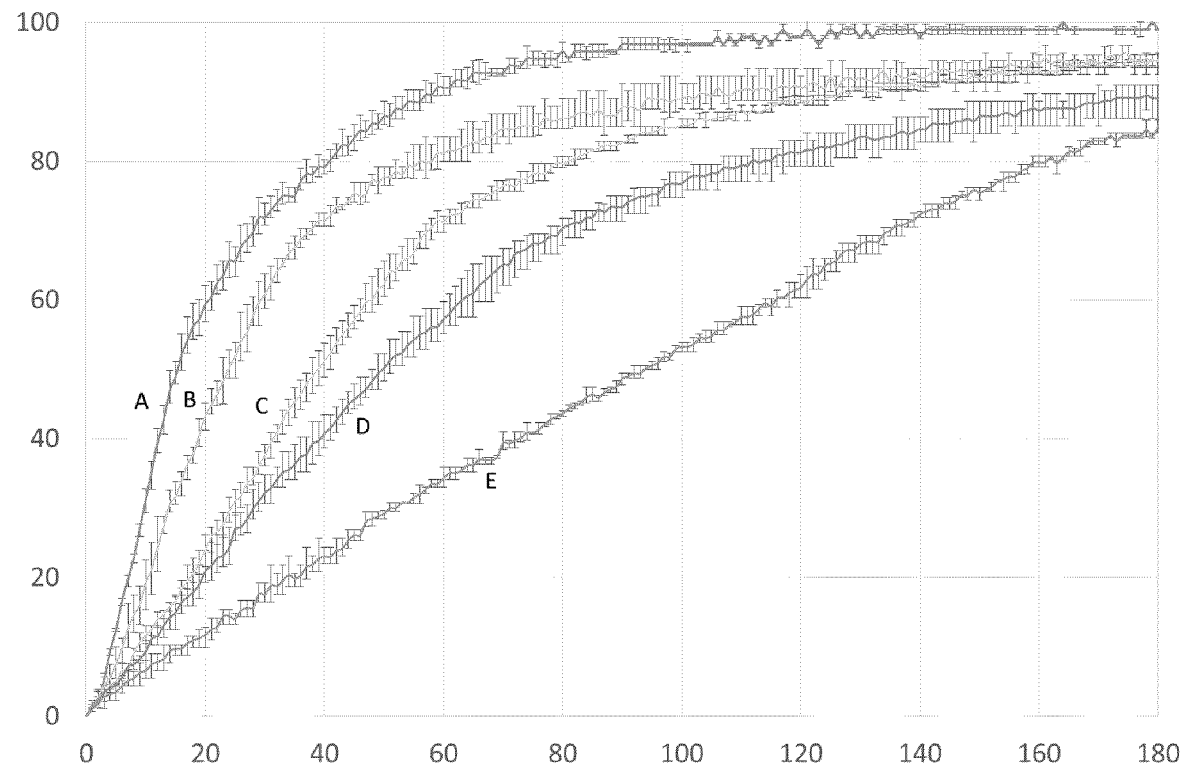
FIG. 4 is a plot of dissolution (%) (vertical axis) versus time(s) (horizontal axis) for porous amorphous powders with different compositions.
Figure 5:
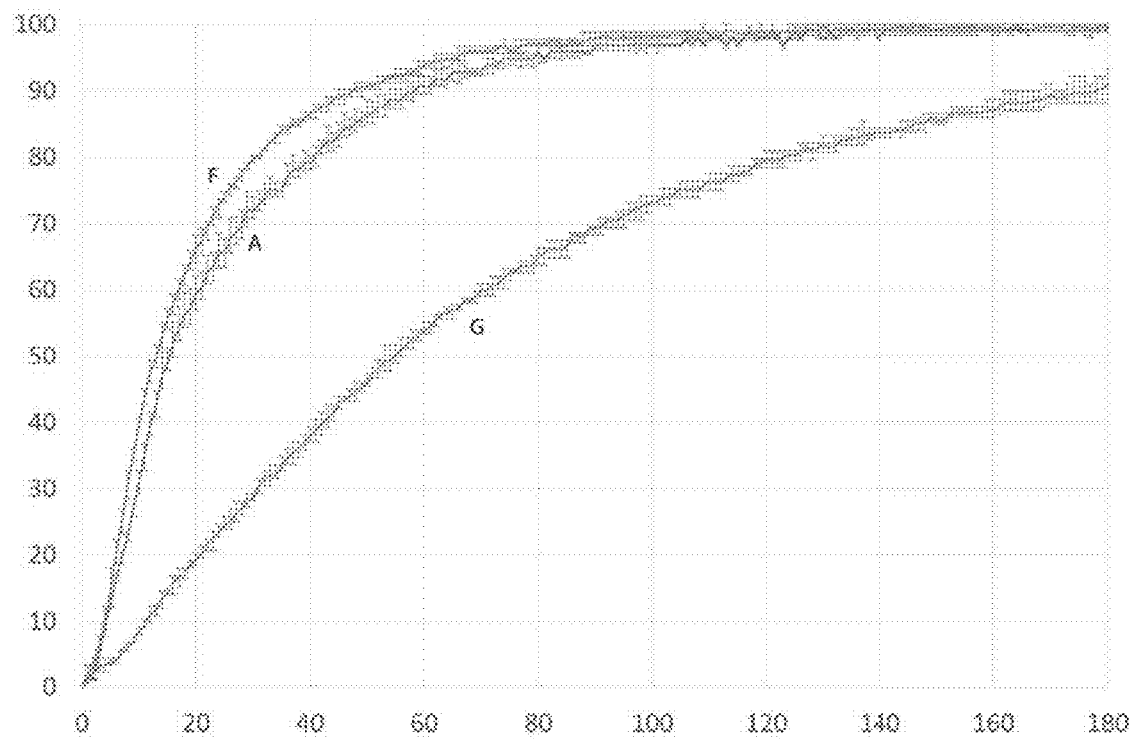
FIG. 5 is a plot of dissolution (%) (vertical axis) versus time(s) (horizontal axis) for amorphous powders with different levels of closed porosity.

The result of varying composition is shown in FIG. 4. Powders with a lower proportion of sucrose dissolve more slowly. The result of varying the porosity is shown in FIG. 5. The powders with significant porosity (A and F) dissolved much more rapidly than the un-gassed sample (G).

Some of the powders were used to prepare fat based confectionery in the style of white chocolate tablets. All the tablets had a total sugar content by mass of 58% and were moulded in the same sized mould. A panel of 10 tasters assessed the sweetness of the tablets, tasting samples with the same volume of chocolate. Due to the different densities of the powders the tasted pieces contained different amounts of sugar by weight. For comparison, a reference was prepared with refined crystalline sugar. The tablets were compared in pairs:

| First tablet Powder, ratio, porosity | % sugar by volume | Second tablet Powder, ratio, porosity | % sugar by volume | Result |
|---|---|---|---|---|
| A, 70:30, 50% | 31 | D, 40:60, 57% | 39 | A was sweeter |
| G, 70:30, 6% | 55 | F, 70:30, 33% | 41 | F was sweeter |
| G, 70:30, 6% | 55 | A, 70:30, 50% | 31 | Similar sweetness |
| Reference | 58 | D, 40:60, 57% | 39 | Similar sweetness |

Increasing the ratio of sucrose to skimmed milk powder (A compared to D) increases the sweetness. Increasing the porosity (F compared to G) also increases the sweetness. Increasing the porosity from 6 to 50% (G to A) gave similar sweetness despite a reduction of sugar in the sample from 55 to 31%. This demonstrates that increasing the porosity of the amorphous particles increases their sweetness impact and allows a reduction in overall sugar (by volume). The tablet with amorphous porous powder D gave a similar sweetness to the reference with crystalline sugar, despite containing less sugar by volume. This demonstrates that particles in accordance with the invention may be used to replace conventional sugar, providing similar sweetness at a lower level of addition per chocolate tablet.

Example 7

The porous structure of amorphous particles was examined using synchrotron radiation X-ray tomographic microscopy (SRXTM), at the TOMCAT beamline of the Swiss Light Source (SLS), Paul Scherrer Institut, Switzerland. The acquisition followed a standard approach with the rotation axis located in the middle of the field of view. Exposure time at 15 keV was 300 ms and 1,501 projections equi-angulary distributed over 180° were acquired.

Projections were post-processed and rearranged into corrected sinograms. Stacks of 2161 16 bits Tiff images (2560× 2560 pixel) were generated with a resolution of 0.1625 µm per pixel.

Slice data were analysed and manipulated using Avizo 9.0.0 (https://www.fei.com/software/amira-avizo/) software for computed tomography.

The routine used for the measurement was the following. For each sample, 3 stacks of 500 images were analysed. After sub volume extraction, stacks of images were thresholded using an automatic routine to specifically select the matrix material and calculate its volume. Then the surface of each sample was estimated using the surface generation module of the software and the surface values were extracted. Normalized specific surface was calculated as the ratio of the matrix volume by the total material surface (external and pores).

Figure 6A:
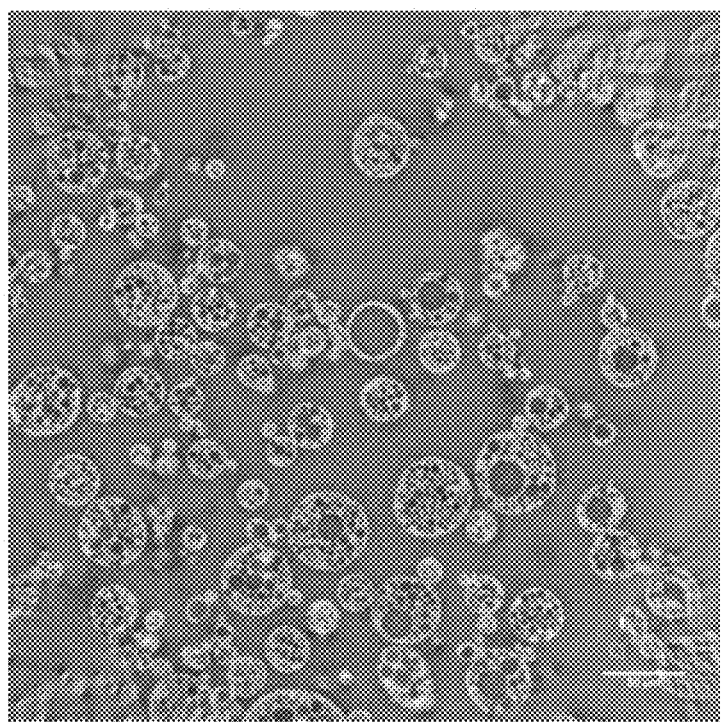
FIG. 6a, 6b, 6c, 6d are synchrotron radiation X-ray tomographic microscopy images for amorphous powders.
Figure 6B:
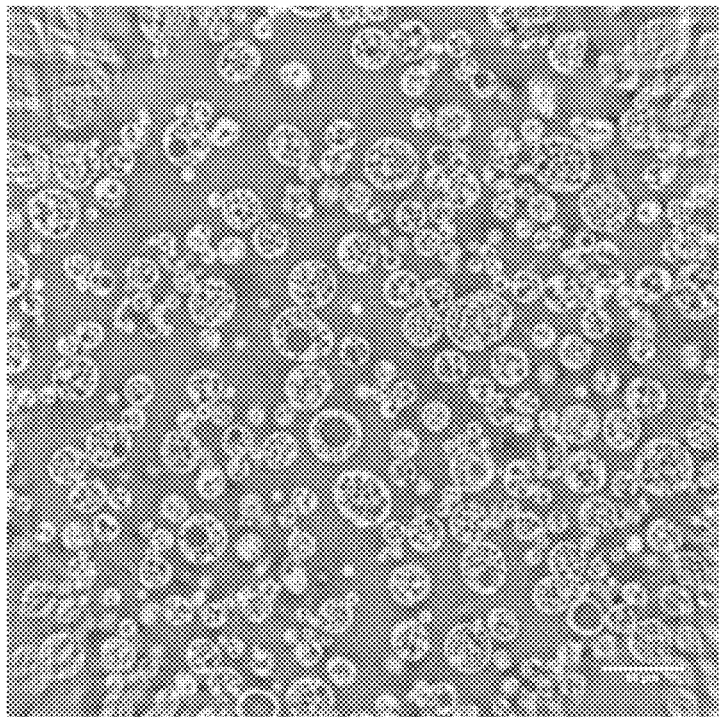
Figure 6C:
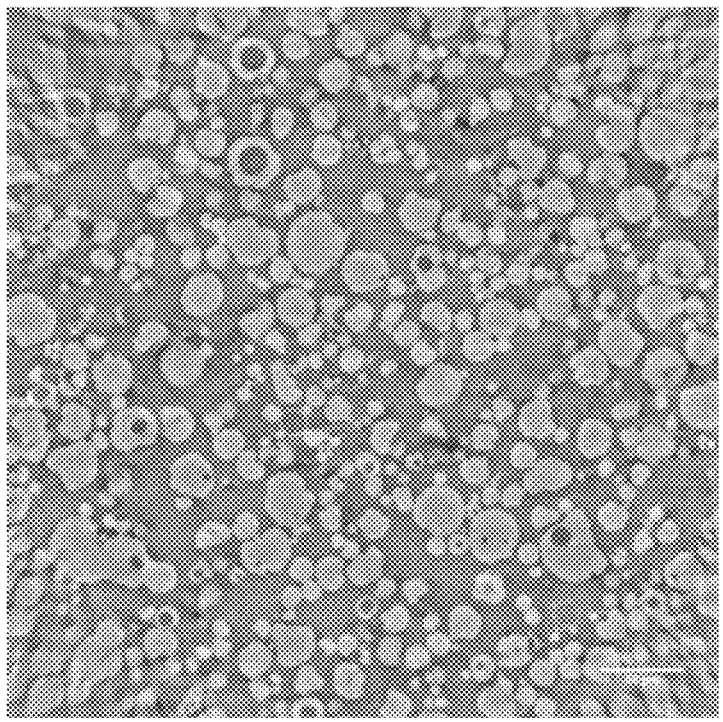
Figure 6D:
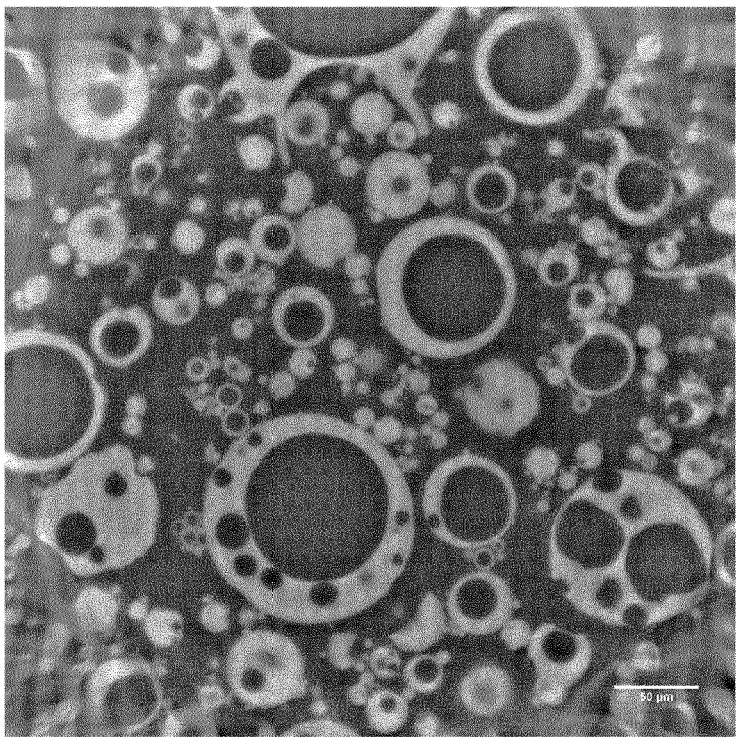

Powders with different levels of closed porosity (A, F and G from Example 5) were imaged, together with a powder (H) as a comparative example which did not contain a surfactant. Powder H was prepared in a similar manner to that described in Example 1, except that the inlet solution contained 50% water, 25% sucrose and 25% of a 21 DE maltodextrin (Roquette) and carbon dioxide was used instead of nitrogen. Powder H had a closed porosity of 31% and a particle size D90 of 184 µm. The images are shown in FIG. 6a (A), FIG. 6b (F), FIG. 6c (G) and FIG. 6d (H). The calculated normalized specific surfaces (mean of three sets of 500 slices) were as follows:

| Powder | A | F | G | H |
|---|---|---|---|---|
| Specific surface ($m^{-1}$) | 0.166 | 0.133 | 0.074 | 0.049 |

As can be seen from the images, the porous structure of powders A and F comprise multiple small pores. The internal surface of these pores leads to a high normalized specific surface value. The normalized specific surface for sample F is lower than sample A, consistent with the measured lower closed porosity value. Sample G, where no gassing was applied, has a low porosity and a low normalized specific surface value. For sample H it can be seen that although it has a similar closed porosity value to sample F, the structure is very different, with large voids within the particles. Such a structure is physically weaker than multiple small pores, and if the outer walls of the particles are broken, no (or very little) porosity remains. Sample H has a correspondingly lower normalized specific surface value.

Example 8

A white chocolate was prepared using agglomerated amorphous porous particles which were reduced in particle size during chocolate manufacture.

For the preparation of the agglomerated amorphous porous particles; sucrose (40%) and skimmed milk powder (60%) were mixed with water at a total solids of 50% until all solids dissolved at a temperature of around 60° C. After pasteurization (5 minutes at 75° C.), the homogeneous solution was spray dried with gas injection. The spray drier used was an open top spray drier with secondary air recirculation to trigger particle agglomeration. The solution temperature was controlled between 60 and 70° C. and nitrogen was added under pressure in a similar manner to Example 1. The output powder moisture content was 20-30 g/kg. The powder had a closed porosity of 46.5% and a particle size distribution D90 of 200 µm.

White chocolate was manufactured using this agglomerated amorphous porous powder:

| Ingredients | Amount (wt %) |
|---|---|
| Cocoa butter | 23 |
| Milk powder (whole and skimmed) | 54 |
| Milk fat | 4 |
| Crystalline sucrose | 4.5 |
| Amorphous porous powder | 14 |
| Lecithin and vanilla | 0.5 |

The dry ingredients and 70% of the cocoa butter were mixed at around 50° C. for 15 minutes. After mixing, the resulting paste was passed through a two-roll refiner and a five-roll refiner to produce flakes. The resulting D90 particle size was around 50 µm.

After refining, the refined mass was conched in a Frisse conche with the addition of the remaining cocoa butter, the milk fat, lecithin and vanilla. The chocolate was tempered and moulded into tablets.

A reference tablet was made in the same manner as above, but the amorphous porous powder was replaced at 1.9 times its mass by crystalline sucrose; effectively occupying the same volume as the replaced amorphous porous powder.

The density measurement of the tablets were measured using a Geopyc 1360 instrument (Micrometrics, US).

To calculate the envelope density of a sample, the envelope volume of the chamber without sample is first determined. A blank run is done with the chamber filled with a medium (DryFlo) and the volume is measured. The sample is then placed in the chamber with the medium and the volume is measured again. The difference between these two measurements is the envelope volume of the sample including its pores. Knowing the sample's weight, the envelope density is calculated.

Before measuring the chocolate tablets sample, some preliminary tests were performed. The size of the chamber, the force and the number of cycles are factors which can influence the envelope volume measurements. For chocolate tablets, the optimized conditions used for the measurements were a chamber of 38.1 cm of diameter, a force of 90 N and 5 cycles. With those conditions, an accuracy of 1.1% was obtained. The value was taken as an average of triplicates.

The porosity ($\phi$) provided by the amorphous porous particles remaining in the chocolate is calculated by comparing the volume density ($\rho_{ref}$) of the reference tablet and volume density of the chocolate manufactured with agglomerated amorphous porous powder ($\rho_{sample}$). The porosity is calculated as shown in the equation below:

$$\phi_{sample} = 1 - (\rho_{sample})/\rho_{ref}$$

The survival rate of the porosity of the particles in the chocolate corresponds to the ratio between the measured porosity of the tablet and the theoretical porosity obtainable from the initial porosity of the amorphous porous powder.

$$\text{Survival rate} = \phi_{sample}/\phi_{expected}$$

The survival rate was found to be 51%; this corresponds to the particles having an effective porosity of 23% after processing into chocolate.

Figure 7A:
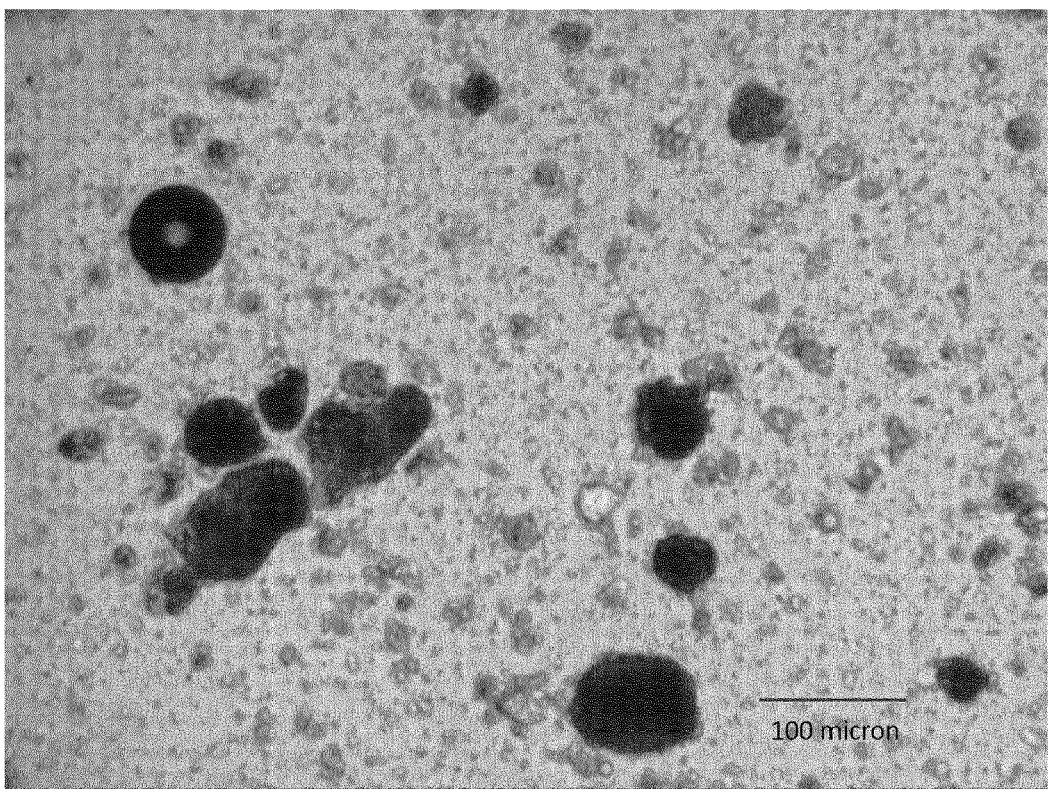
FIGS. 7a and 7b are optical micrographs of white chocolate comprising amorphous porous particles, the chocolate sample having been dispersed in sunflower oil and viewed under transmitted light.
Figure 7B:
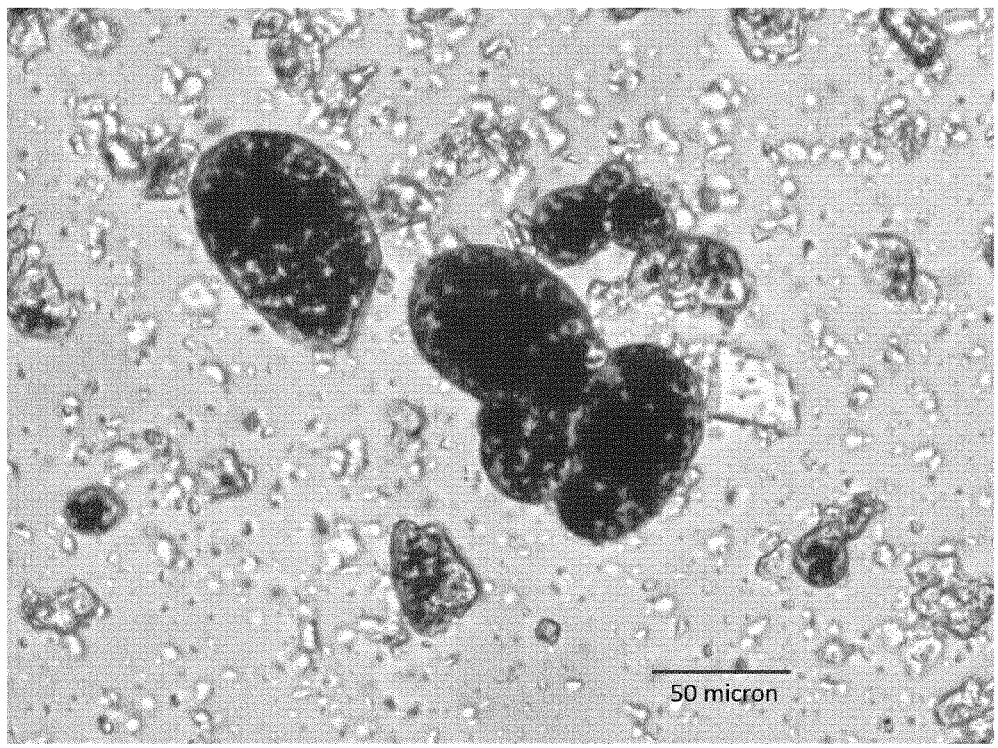
Figure 8:
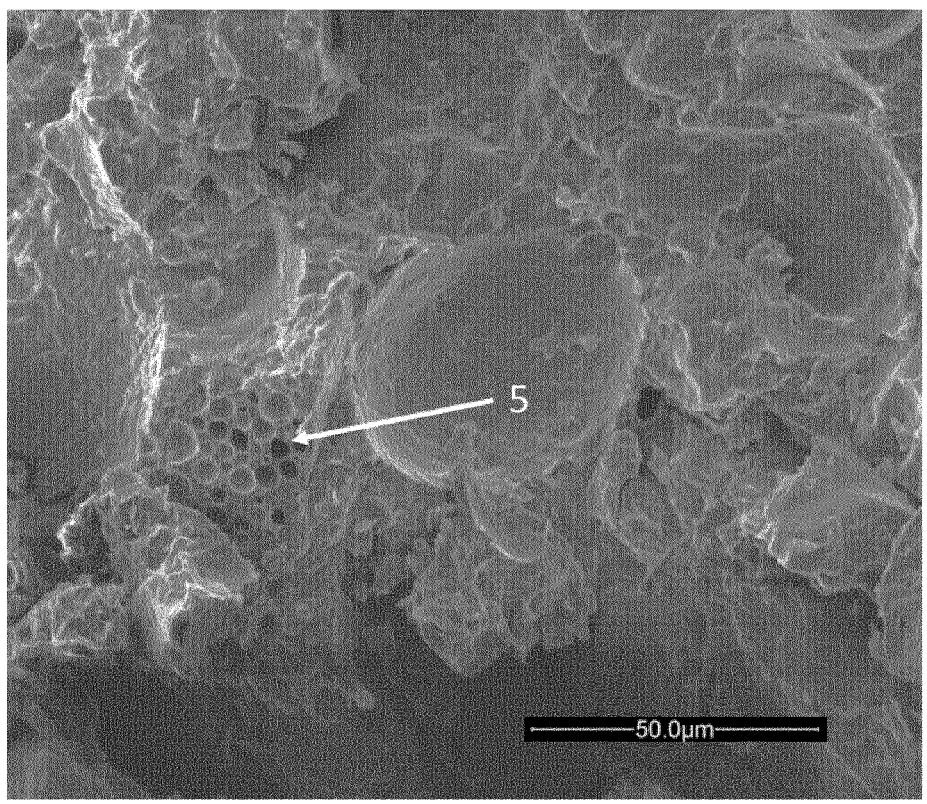
FIG. 8 is a cryo-scanning electron microscopy image of white chocolate comprising amorphous porous particles. An amorphous porous particles according to the present invention which has been broken during refining is indicated at (5).

A sample of the white chocolate was examined by transmitted light microscopy after being dispersed in sunflower oil. Images are shown in FIG. 6. The amorphous porous particles look dark in transmitted light due to light scattering by their internal porosity. The initial powder has largely been fragmented but porosity remains (FIG. 7a). Some agglomerates survive (FIG. 7b). The fine debris in the background includes crystalline sugar. A further sample of the white chocolate was examined by scanning electron microscopy (FIG. 8). The amorphous porous particle is indicated with an arrow (5). The amorphous particle has been fragmented by the refining process, but its internal porosity is retained.

A small panel of tasters compared the chocolate made with amorphous porous powder to the reference chocolate. The same sized piece was taken of each. Due to the different densities of the powders the tasted pieces contained different amounts of sugar by weight. The chocolate made with amorphous porous powder was described as slightly more "powdery" but with a similar sweetness to the reference. This is despite it containing 68% less sucrose for the same volume. Neither sample was found to be "gritty".

The invention claimed is:

1. A fat-based confectionery product comprising amorphous porous particles comprising sugar, a bulking agent and a surfactant, wherein the amorphous porous particles have a closed porosity of between 20 to 60%.

2. The fat-based confectionery product according to claim 1, wherein the amorphous porous particles have a glass transition temperature of at least 40° C.

3. The fat-based confectionery product according to claim 1, wherein a D90 particle size of the amorphous porous particles is below 60 microns.

4. The fat-based confectionery product according to claim 1, wherein the amorphous porous particles have been refined.

5. The fat-based confectionery product according to claim 1, wherein the amorphous porous particles comprise sucrose and skimmed milk, wherein the sucrose is present at a level of at least 30%, and a ratio of the sucrose to the skimmed milk is between 0.5 to 1 and 2.5 to 1 on a dry weight basis.

6. The fat-based confectionery product according to claim 1, wherein the fat-based confectionery product is chocolate.

7. The fat-based confectionery product according to claim 1 comprising 5-60 wt % of the amorphous porous particles.

8. A process of making amorphous porous particles for a fat-based confectionery product, the amorphous porous particles comprising sugar, a bulking agent and a surfactant, wherein the amorphous porous particles have a closed porosity of between 20 to 60%, the process comprising:
   subjecting a mixture comprising sugar, bulking agent and surfactant to a pressure;
   adding gas to the mixture;
   spraying and drying the mixture to form amorphous porous particles; and
   reducing a particle size of the amorphous porous particles.

9. The process according to claim 8, wherein the gas is selected from the group consisting of nitrogen, carbon dioxide, argon, nitrous oxide, and combinations thereof.

10. The process according to claim 8, wherein the amorphous porous particles are agglomerated during or after the spraying and drying.

11. The process according to claim 8, wherein the fat-based confectionery product is chocolate.

12. The process according to claim 8 further comprising providing the amorphous porous particles as a sugar replacer in the fat-based confectionery product.

13. The process according to claim 8, wherein the pressure is from 50 to 300 bar.

14. The process according to claim 8, wherein the pressure is from 100 to 200 bar.

* * * * *